United States Patent
Rai

(10) Patent No.: US 7,953,681 B2
(45) Date of Patent: May 31, 2011

(54) SYSTEM AND METHOD OF FORECASTING PRINT JOB RELATED DEMAND

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 738 days.

(21) Appl. No.: 11/954,580

(22) Filed: Dec. 12, 2007

(65) Prior Publication Data

US 2009/0157579 A1    Jun. 18, 2009

(51) Int. Cl.
  *G06E 1/00* (2006.01)
  *G06E 3/00* (2006.01)
  *G06F 15/18* (2006.01)
  *G06G 7/00* (2006.01)
(52) U.S. Cl. ........................................................ 706/21
(58) Field of Classification Search .................. None
See application file for complete search history.

(56) References Cited

U.S. PATENT DOCUMENTS

| | | | |
|---|---|---|---|
| 7,092,922 B2 | 8/2006 | Meng et al. | |
| 7,161,699 B2* | 1/2007 | Matoba | 358/1.15 |
| 2004/0135838 A1* | 7/2004 | Owen et al. | 347/19 |
| 2007/0070379 A1* | 3/2007 | Rai et al. | 358/1.13 |
| 2007/0177191 A1* | 8/2007 | Eschbach et al. | 358/1.15 |
| 2008/0201182 A1* | 8/2008 | Schneider et al. | 705/7 |

OTHER PUBLICATIONS

Mehrotra, 'Elements of artificial neural networks': 1997, MIT press.*

* cited by examiner

*Primary Examiner* — Jeffrey A Gaffin
*Assistant Examiner* — Peter Coughlan
(74) *Attorney, Agent, or Firm* — Pepper Hamilton LLP

(57) ABSTRACT

Systems and methods for forecasting print demand are disclosed. Print demand data is collected and stored for each print job processed during a selected time interval, and processed with a computer implemented service manager to obtain a first demand series with multiple demand components and a second demand series with one demand component. Each of the multiple demand components is less than, and the one demand component is greater than, a selected variability level. The service manager is adapted to (1) generate a first demand related forecast with a combination of the multiple demand components, and (2) use a neural network to generate a second demand related forecast with the one demand component. The neural network includes multiple neurons optimally weighted with respect to print-related demand data collected over selected time intervals. The number of neurons is optimized to improve forecasting accuracy and re-optimized after a selected time interval.

18 Claims, 10 Drawing Sheets

US 7,953,681 B2

SYSTEM AND METHOD OF FORECASTING PRINT JOB RELATED DEMAND

CROSS-REFERENCE TO RELATED APPLICATION

Cross-reference is made to U.S. patent application Ser. No. 11/868,993 that was filed on Oct. 9, 2007 by the same inventor and assignee with the same title.

BACKGROUND AND SUMMARY

The disclosed embodiments relate generally to a system and method for improving the operability of a document production environment and, more particularly to an improved approach of forecasting future print-related demand in a document production environment.

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

In one example of print shop operation, product variety (e.g., the requirements of a given job) can be low, and the associated steps for a significant number of jobs might consist of printing, inserting, sorting and shipping. In another example, product variety (corresponding, for instance, with job size) can be quite high and the equipment used to process these jobs (e.g. continuous feed machines and inserting equipment) can require a high changeover time. Experience working with some very large print shops has revealed that print demand exhibits a tremendous variety of time series behavior. High variability in such large print shop environments can result from large volumes, and may be manifested in what is sometimes referred to as "fat-tailed" or "heavy-tailed" distributions.

Forecasting demand for a given large print shop can be useful in, among other things, managing shop resources. However, traditional approaches of forecasting may be insufficient to adequately characterize high variability demand. In particular, it has been found that the lack of structure associated with a high variability demand can make forecasting difficult, and convergent forecasting results may simply be unattainable for certain high variability demand series when using conventional forecasting techniques.

U.S. Patent Application Publication No. 2007/0070379 A1 to Rai et al. (published on Mar. 29, 2007) discloses an approach for planning print production in a print production enterprise with a neural network having multiple neurons. Each of the neurons is connected to at least one other neuron by a logic connection. As disclosed, the neural network is trained by measuring multiple workflow variables associated print equipment components and assigning a weighting factor to each logic connection. The neural network is updated when a new equipment component is added to the print production enterprise or one of the print equipment components is permanently removed from the print production enterprise. The neural network is also updated when one of the print equipment components is unavailable due to maintenance or repair, or one of the print equipment components is unavailable due to a prior commitment to another print job. Further detailed discussion of neural networks is provided in U.S. Pat. No. 7,092,922 to Meng et al. The pertinent portions of the '922 patent, along with the pertinent portions of the '0379 publication, are incorporated herein by reference.

The '0379 publication may be viewed as employing a causal forecasting model to improve print production planning. That is, the neural network is created with print production related measurements for one or more workflow variables associated with one or more print jobs. While causal forecasting appears well suited for the intended purpose of planning print shop production, it might be difficult to apply the same type of forecasting to the area of forecasting print-related demand. More particularly, many of the causal factors associated with forecasting print-related demand are typically not within the direct control of print production enterprise managers, particularly when the print production enterprise is dispersed throughout a network. Consequently, to achieve causal forecasting for a sizable print production enterprise, a considerable amount of information would have to be obtained from the customers, possibly through surveys.

In one aspect of the disclosed embodiments there is disclosed a print demand forecasting system for use with a print production system in which multiple print jobs are processed over a selected time interval. The print demand forecasting system includes: a data collection tool, said data collection tool collecting print demand data for each print job processed during the selected time interval; mass memory for storing the collected print demand data; and a computer implemented service manager for processing the stored print demand data to obtain a first demand series with two or more demand components and a second demand series with one demand component, each one of the two or more demand components being less than a selected variability level and the one demand component being greater than the selected variability level, said computer implemented service manager being adapted to (1) generate a first demand related forecast with a combination of the two or more demand components, and (2) generate a second demand related forecast with the one demand component. As contemplated, the second demand related forecast is generated with a neural network. The neural network includes a layer including a plurality of neurons. Each one of the plurality of neurons is weighted, and the weighting of each one of the plurality of neurons is optimized with respect to a set of print-related demand data collected over one or more selected time intervals. The plurality of neurons corresponds with a number that is optimized to improve accuracy of forecasting. The number is re-optimized after a selected time interval that varies as a function of a document production application dictating demand forecasting.

In another aspect of the disclosed embodiments there is disclosed a system of forecasting print-related demand in a document production environment. The print-related demand forecasting system includes: a processor; and a processor readable storage medium in communication with the processor, the processor readable storage medium containing one or more programming instructions for: providing a hidden layer including a plurality of neurons and causing each one of the plurality of neurons, corresponding with a number, to be weighted with a first set of print-related demand data, optimizing the number of neurons to improve accuracy of forecasting, providing an input layer including a plurality of inputs, the plurality of inputs communicating with the plurality of neurons of the hidden layer, communicating a second set of print-related demand data to the plurality of inputs of the input layer, the second set of print-related demand data corresponding with a demand series obtained from the document production environment, re-optimizing the number of neurons after a selected time interval elapses, where the selected time interval varies as a function of a document production application dictating demand forecasting, and responsive to communicating the second set of print-related demand data to the plurality of inputs, a print-related demand forecast output for the document production environment is generated with the plurality of weighted neurons of the hidden layer.

In yet another aspect of the disclosed embodiment there is disclosed a method of optimizing a print-related demand forecasting system. The optimizing method includes: providing a hidden layer including a plurality of neurons and causing each one of the plurality of neurons to be weighted with a first set of print-related demand data, wherein the plurality of neurons correspond with a number; optimizing the number of neurons to improve accuracy of forecasting; providing an input layer including a plurality of inputs, the plurality of inputs communicating with the plurality of neurons of the hidden layer; communicating a second set of print-related demand data to the plurality of inputs of the input layer, the second set of print-related demand data corresponding with a demand series obtained from the document production environment; re-optimizing the number of neurons after a selected time interval elapses, wherein the selected time interval varies as a function of a document production application dictating demand forecasting; and, responsive to communicating the second set of print-related demand data to the plurality of inputs, generating a print-related demand forecast output for the document production environment with the plurality of weighted neurons of the hidden layer.

BRIEF DESCRIPTION OF THE DRAWINGS

The present disclosure may be better understood and its numerous features should become apparent to those skilled in the art by reference to the accompanying drawings in which.

DESCRIPTION OF DISCLOSED EMBODIMENTS

Figure 1:
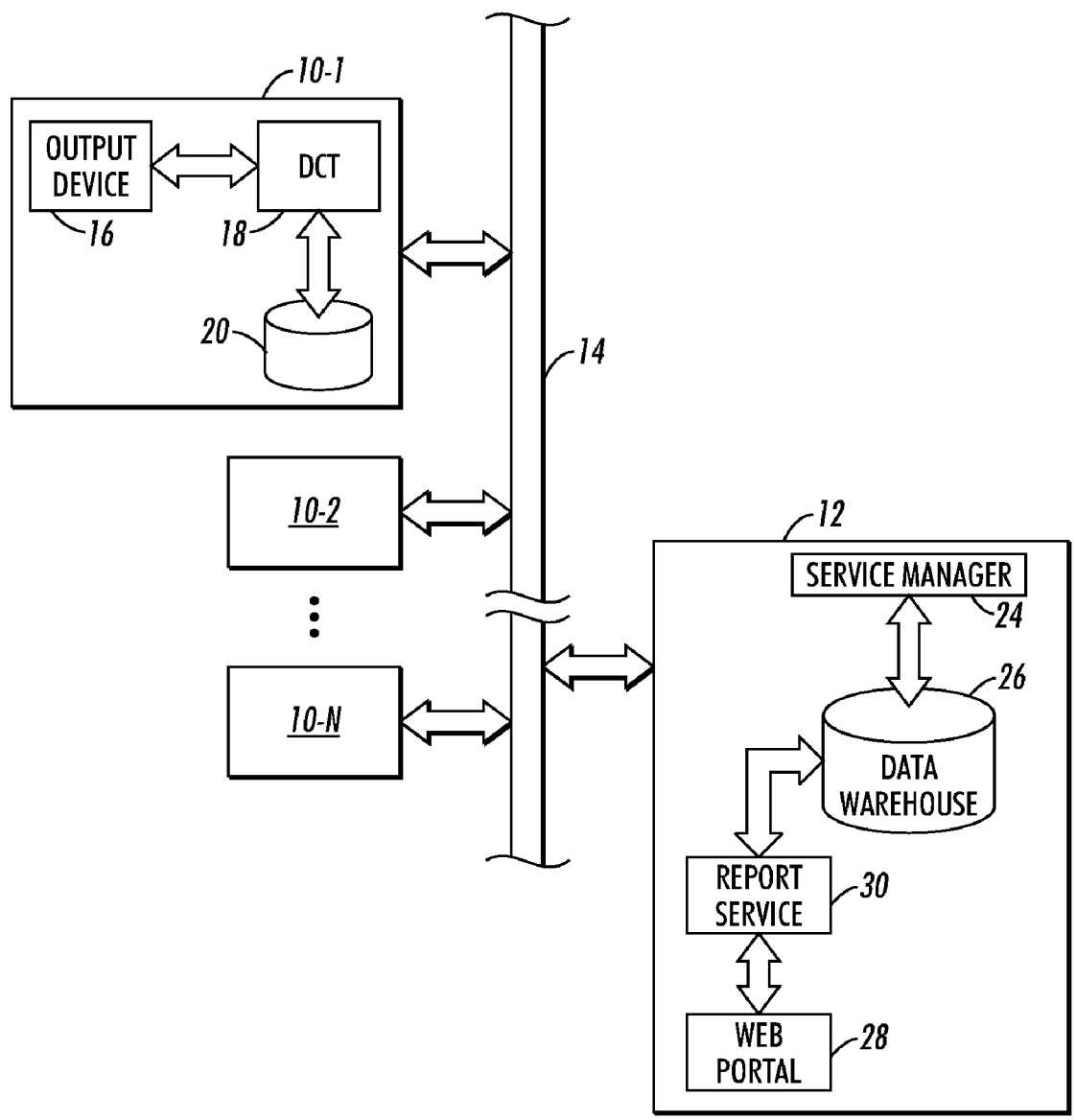
FIG. 1 is a block diagram of a data collection/processing architecture, suitable for use with the disclosed embodiments.

Referring to FIG. 1, a network print production system, with a data processing center, is shown. In the illustrated approach of FIG. 1, a series of document production centers 10-1 through 10-N (collectively referred to as document production centers 10, some of which may include print shops or production print facilities) communicate with the data processing center 12 by way of a network (such as a wide area network (possibly including the world wide web)) 14. At least one of the document production centers (e.g., document production center 10-1) includes an output device 16 communicating with a data collection tool ("DCT") 18. While particular attention is paid below to document production center 10-1, several of the document production centers 10 may include the combination of at least one output device and a DCT. Additionally, as should be apparent to those skilled in the art, the output device 16 may be used in the context of a print shop with a number of other document processing related devices, as illustrated in U.S. Pat. No. 7,079,266 to Rai et al., the pertinent portions of which are incorporated by reference.

In one example, the DCT is a programmable subsystem (possibly assuming the form of a suitable application programmable interface) capable of capturing data, including performance or demand related data, from the output device at selected time intervals. It should be appreciated that, consistent with U.S. Pat. No. 7,242,302 to Rai et al., the pertinent portions of which are incorporated herein by reference, the output device could assume a number of forms, such as a handheld device, PDA, or RFID related device. The DCT 18 may communicate with mass memory 20 for short term storage of, among other things, demand related data. Additionally, a wide variety of performance related information from the output device 16, including information relating to job type, client, duplex/simplex, page counts and impression counts, just to name a few, may be stored in mass memory 20.

The data processing center 12 includes a "service manager" 24 communicating with a "data warehouse" 26. In one illustrated embodiment, the service manager comprises a processing platform that is capable of performing the types of forecasting calculations described below. As contemplated, a variety of data from the document production centers 10, including demand data from mass memory 20, is stored in the data warehouse. The data warehouse may also store job performance related data in the form of a database to facilitate a data segmentation approach, as described below. In the illustrated approach of FIG. 1, output of the service manager is placed in a format (e.g., a report including at least one forecast plot) suitable for communication to a network web portal 28 by a report generating application or service 30. The report, in turn, can be used, to the extent necessary, to adjust operation of the document production center to which the report relates. One such adjustment might include ordering inventory based on the report, while another such adjustment might include using the report to control aggregate or capacity planning.

Referring still to FIG. 1, and particularly to the service manager 24, the associated application may use historical print demand to forecast future demand. Based on investigations performed by the present inventors, print demand data (for example, daily page counts or impression counts) for production print shops show unique properties that are not necessarily found in the other domains where forecasting is applied (such as econometrics or product demand). These investigations have shown a substantial amount of variety in time series behavior, including time series with trends, cycles, and some fat-tailed phenomena. Indeed, the time series encountered by the present inventors in the context of production printing do not appear amenable to the sorts of decomposition suggested by the forecasting literature. Inspired by the unique properties of print demand, the present inventors have developed a decomposition strategy that is contrary to the decomposition strategies of the literature. As will appear, the reason the disclosed strategy works is that the statistical models for time series are extended to mixtures, which may not work for many of the data to which time series analysis is applied, but has been found to work very well for print demand data, especially that in production print shops.

Many of the observed time series in the area of production printing appear to demonstrate mixture-like behavior. These mixtures, however, are not necessarily well modeled by a single model, particularly when one component has high volumes and/or high variability. Further, the high variability component may be the result of simply a high but finite variance or could be "fat-tailed" (infinite variance). In the former case, it has been found that forecasting is possible if the high variability component has a strong periodic structure. In the latter case, however, forecasting has been found to be highly problematic and convergence is not achieved even when using the known auto regressive integrated moving average (ARIMA) algorithm with the corresponding model order increased.

In the disclosed embodiment, three kinds of decomposition methods are contemplated: 1) A user (print shop performance analyst) plots aggregate time series, notices a mixture behavior, determines which demand corresponds to which job type (indicated by a database field), and segments the time series based on those fields; 2) The user plots the aggregate time series, notices a mixture behavior, and selects the components graphically with a suitable user interface; 3) Mixtures are detected automatically using a model-fitting algorithm (e.g., Expectation-Maximization). Segmentation can be performed with a database attribute (e.g., an attribute, such as job or form type, client, duplex/simplex (i.e., media "plex"), obtained from the data warehouse 26 of FIG. 1), by time slice (e.g., Mondays or firsts of the month), or by statistical thresholding (e.g., demand over and under 30,000 prints).

Figure 2:
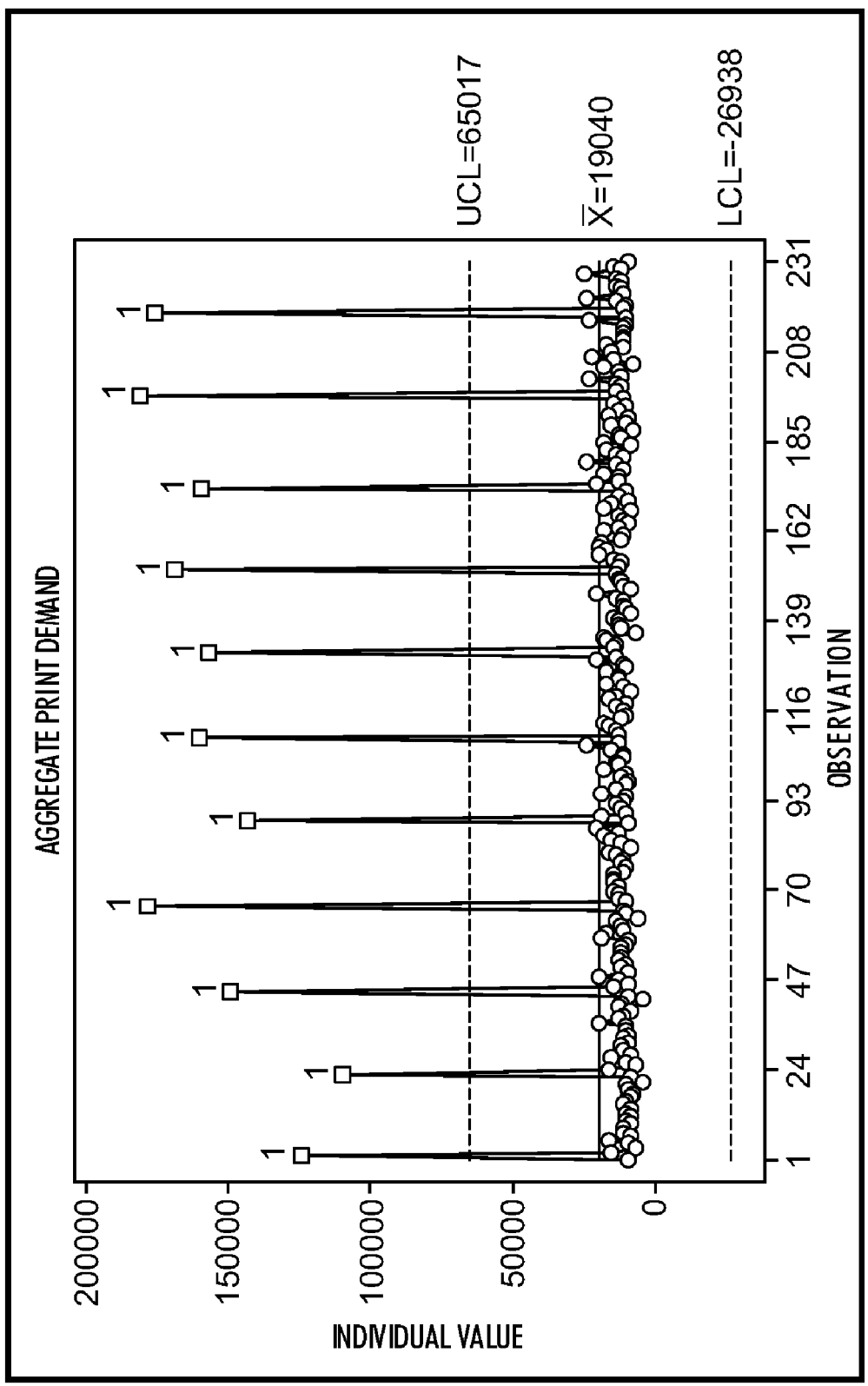
FIG. 2 is a control diagram illustrating the demand experienced by an exemplary production print shop.
Figure 3:
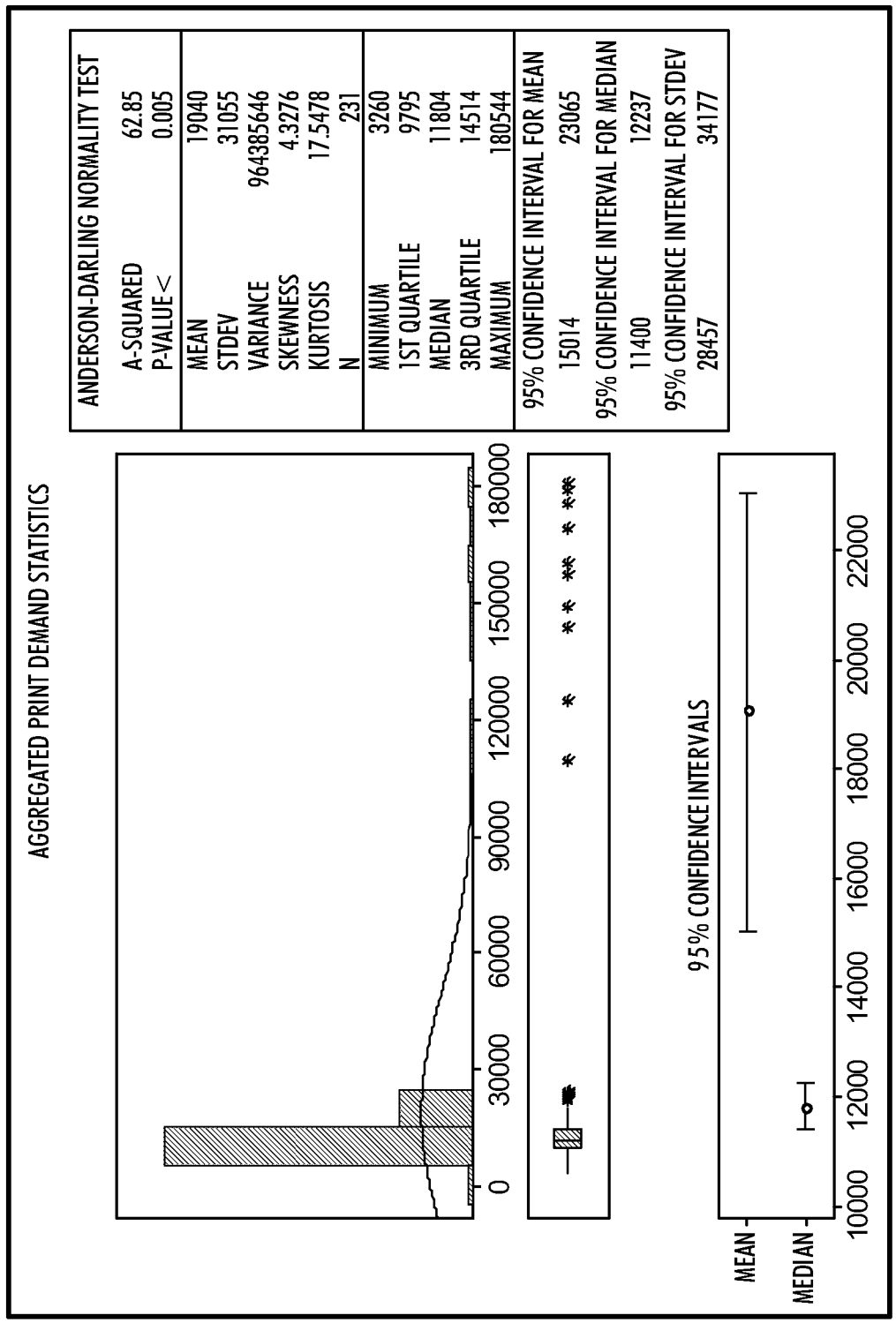
FIG. 3 is a schematic representation of the statistics associated with the demand experienced by the exemplary production print shop.

Referring to FIG. 2, the demand experienced by an exemplary production print shop is shown in the form of a control chart. The demand shown in FIG. 2 is an aggregation of demand for three different applications that run on three different form types. The high variability is reflected by the several points that are out of control. Referring to FIG. 3, statistics associated with the demand experienced by the exemplary production print shop is shown.

Figure 4:
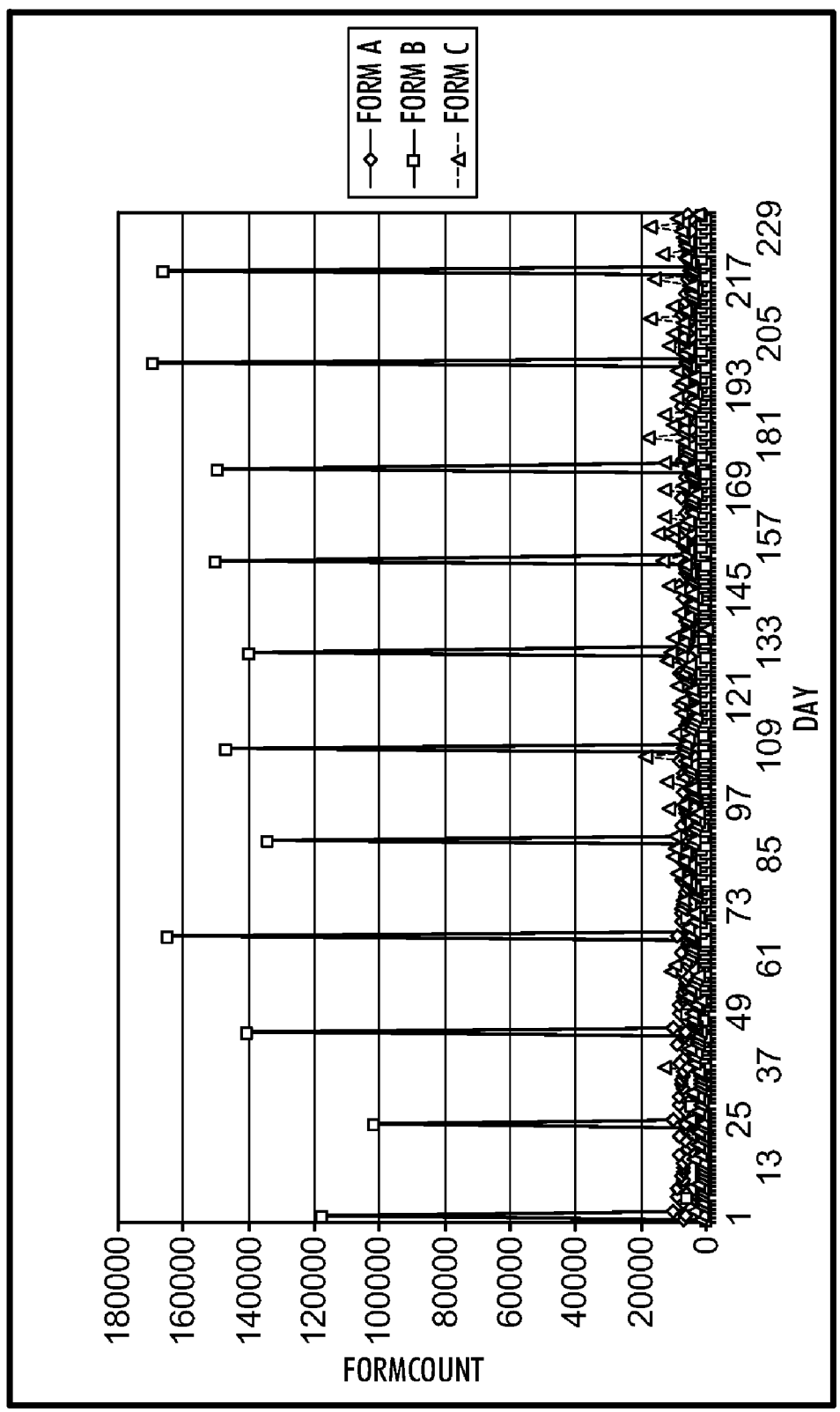
FIG. 4 is a graph illustrating independent demand for three individual applications.

Referring to FIG. 4, the independent demand for the three applications is shown. It can be observed, based on an inspection of FIG. 4, that the demand for Form B experiences significant fluctuations relative to the demand for either Form A or Form C. This observation can be confirmed by reference to the following table including selected information about Forms A-C.

TABLE 1

Statistical Characterization of Demand Profiles

| | Form A | Form B | Form C |
| --- | --- | --- | --- |
| Count | 231 | 231 | 231 |
| Average | 5789 | 7578 | 5673 |
| Standard Deviation (SD) | 1596 | 30770 | 3388 |
| Coefficient of Variation (CV) | 0.28 | 4.06 | 0.60 |
| Total Volume | 1,337,189 | 1,750,512 | 1,310,443 |

In particular, the SD and CV associated with Form B are quite high relative to the SD and CV associated with either Form A or Form C.

Figure 5:
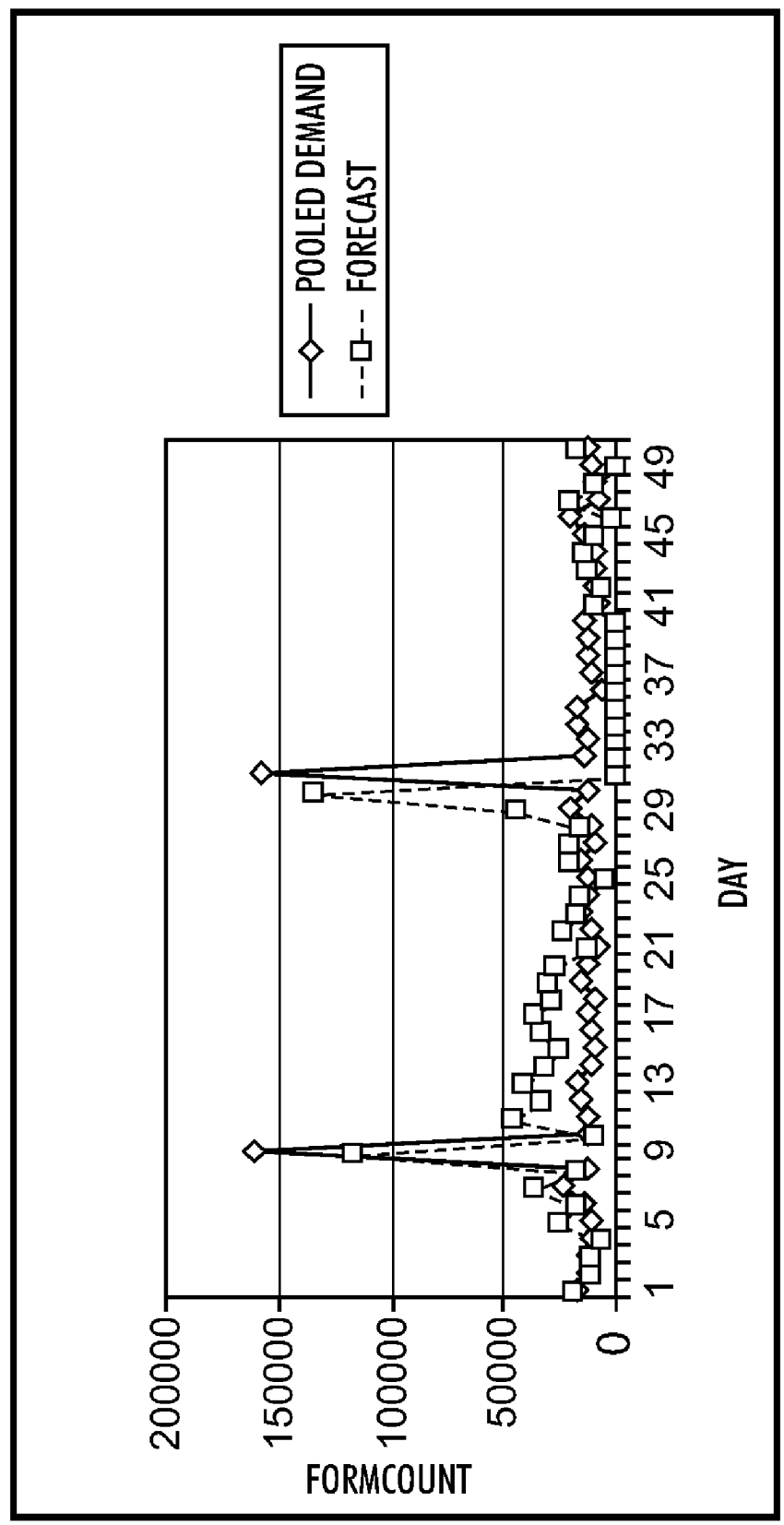
FIG. 5 is a graph illustrating a forecast for 50 days in which actual demand data is plotted against a forecast based on pooled demand from a single model.

Based on an accepted approach of the literature (in which demand from a single model is pooled), a forecast for the aggregated demand of Forms A-C was obtained with the ARIMA algorithm. Referring specifically to FIG. 5, actual demand versus forecasted demand is shown. The illustrated example of FIG. 5 includes a forecast for 50 days where mean absolute deviation (MAD) is 16,432 and mean absolute percentage error (MAPE) is 1.01.

It may be noted that a higher order ARIMA modeling was required to even get the single model to converge. More particularly, pursuant to the forecasting technique, the first 100 points were used to initially generate the single model. 10 days were then forecasted into the future. The next set of forecasts (10 days into the future) came from an ARIMA model built using 110 data points. Subsequently, an ARIMA model using 120 data points was built. Thus FIG. 5 includes five sets of forecasts.

Figure 6:
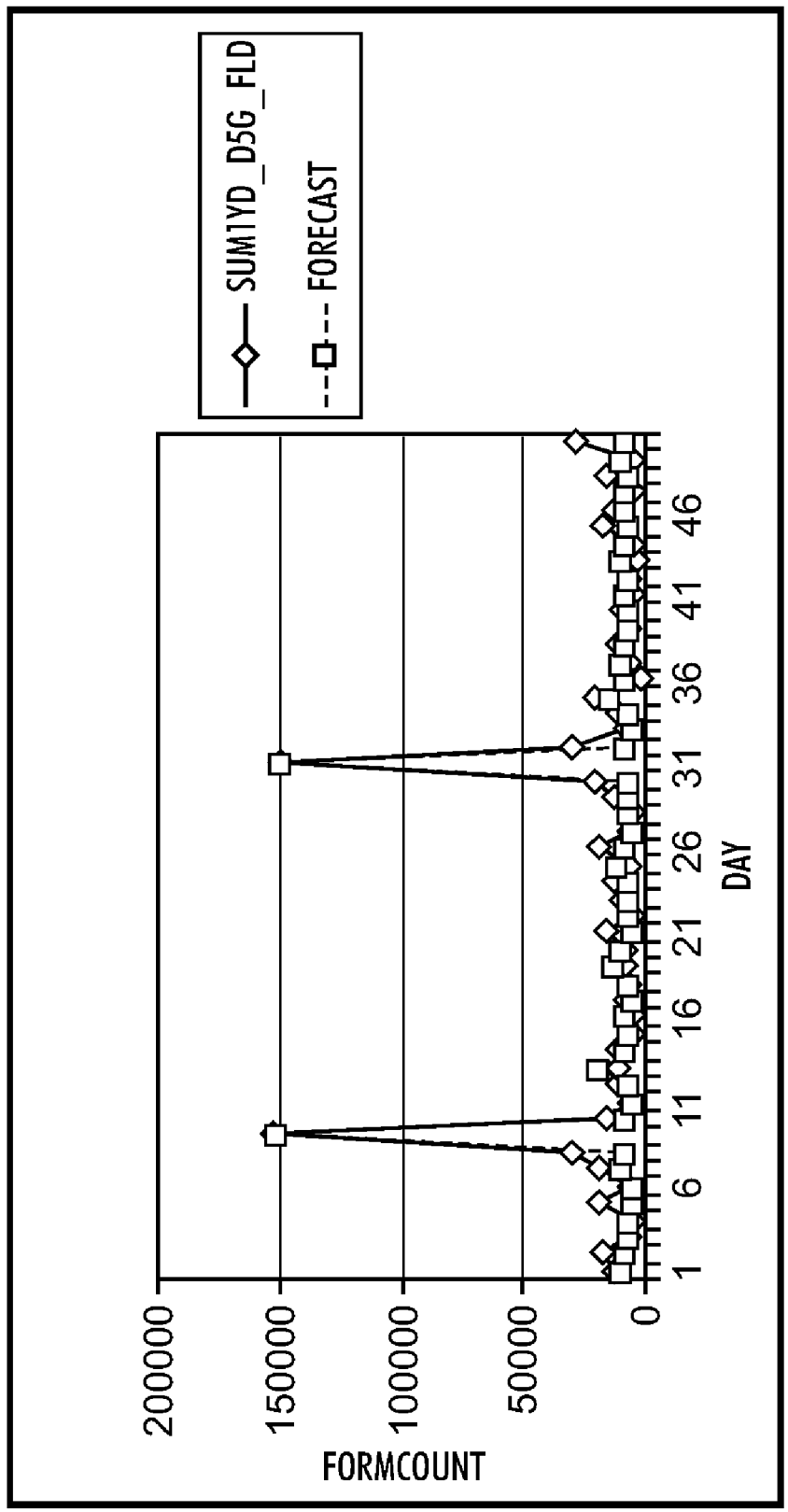
FIG. 6 is a graph illustrating a forecast of the disclosed embodiments in which low variability demand is pooled, high-variability demand is kept separate, and the independent forecasts then summed to obtain an aggregate forecast.

Contrary to the above approach, in which demand is pooled for Forms A-C, two demand series, one corresponding with low variability demand (for Form A and Form C) and the other corresponding with high variability demand (for Form B) were created. The demand for Form A and Form C was pooled and forecasted together, while the demand for Form B was forecasted separately. Referring to FIG. 6, a combination of the two forecasts, where MAD=5482.54 and MAPE=0.59, is shown.

The approach associated with FIG. 6 (where two separate forecasts (Form A and Form C pooled, and Form C separate) are combined) can clearly lead to significantly improved forecasting relative to the approach associated with FIG. 5 (where a single forecast based on pooled demand is employed). The improved forecasting is specifically evidenced by the reduction in MAPE between the two approaches (about 40%).

Figure 7:
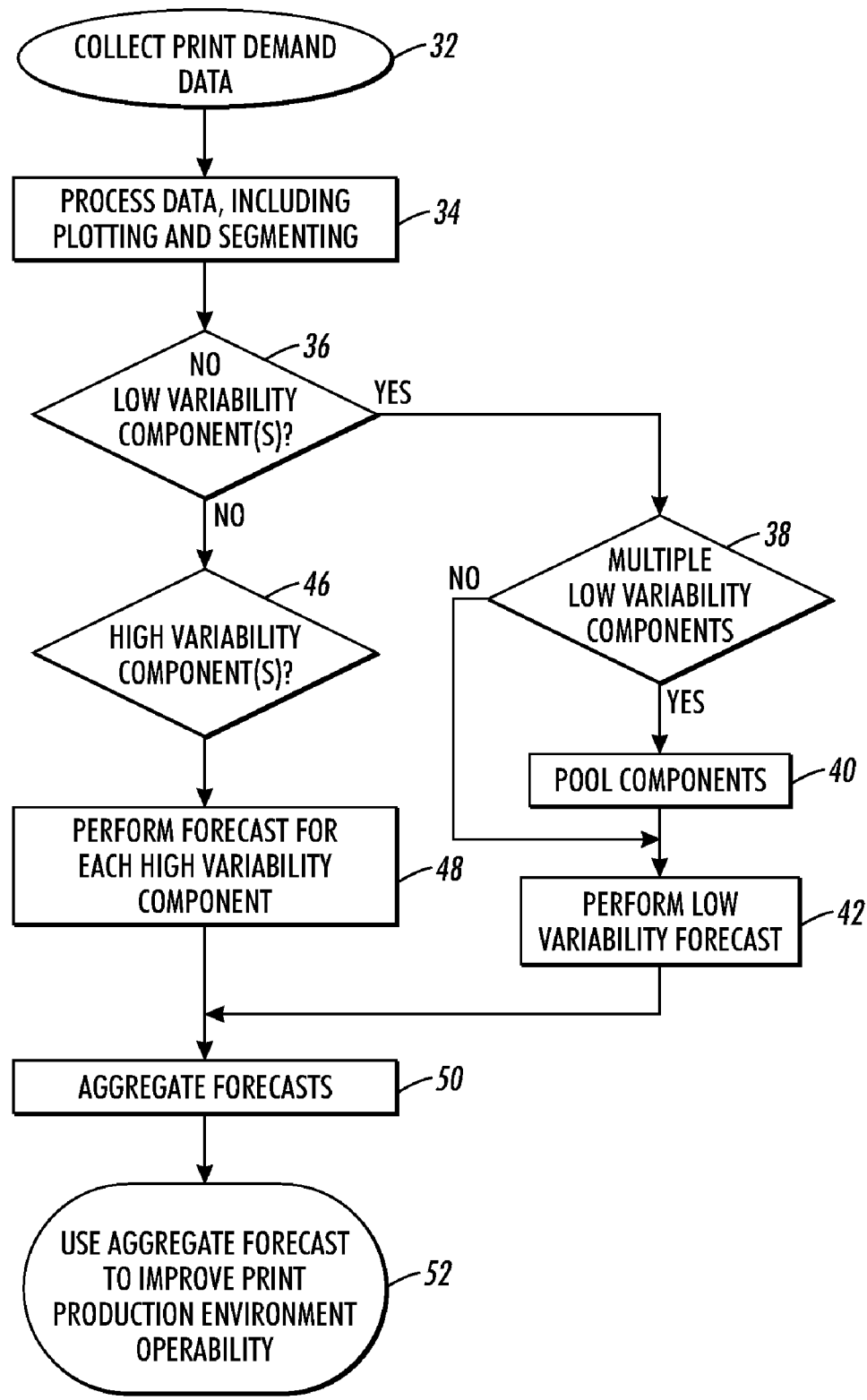
FIG. 7 is a flowchart demonstrating some of the functionality of the disclosed embodiments.

Referring now to FIGS. 1 and 7, a flowchart illustrating an exemplary implementation for the disclosed embodiments, in which forecasting is achieved with two separate forecasts (one with pooling and one without) is shown. Initially, at 32, print demand data is collected for jobs processed at one or more of print production facilities 10. For ease of description, the example of FIG. 7 is described in the context of a single print shop, but as follows from the description above, the disclosed embodiments are as well suited for use in a single print shop as in a networked printing system with multiple print shops.

After a suitable amount of demand related data has been collected, the resulting aggregate print demand data can be plotted with the service manager 24, via 34, and then segmented, as described above. At 36, a check for at least one low variability demand component is performed. Referring still to FIGS. 1 and 7, the number of low variability components may be initially assessed at 38 and, if there are multiple low variability demand components, then a combination or pooling of components is performed with 40. Using one of the forecasting algorithms mentioned above, a forecast may be performed at 42 for one or more low variability demand components.

Referring to 46 (FIG. 7), the number of high variability demand components may be determined, and, at 48, a forecast is, if possible, performed for each high variability component. As contemplated, one of several known techniques may be used in forecasting a given high variability component, provided the forecasting technique used allows for convergent forecasting results. It may be noted that (1) the high variability demand components are not, in accordance with the disclosed embodiments, pooled for forecasting, and (2) it may not be possible, by means of the disclosed embodiments, to accurately forecast each high variability demand component. Regarding (2), it has been found that, without some level of structure in a given demand series (e.g., periodicity), forecasting can be difficult. Moreover, it has been found that convergent forecasting results may simply be unattainable for certain high variability demand series.

Referring conjunctively to FIGS. 6 and 7, after performing forecasting on each high variability demand component, where possible, an aggregation or combination of forecasts can be performed at 50. As indicated at 52, the operability of print production system (which might range from a standalone print shop to multiple networked print shops) may be improved with the forecasting approach of the disclosed embodiments. For instance, the improved forecasting approach can be used to improve resource management or to facilitate capacity planning.

Figure 8:
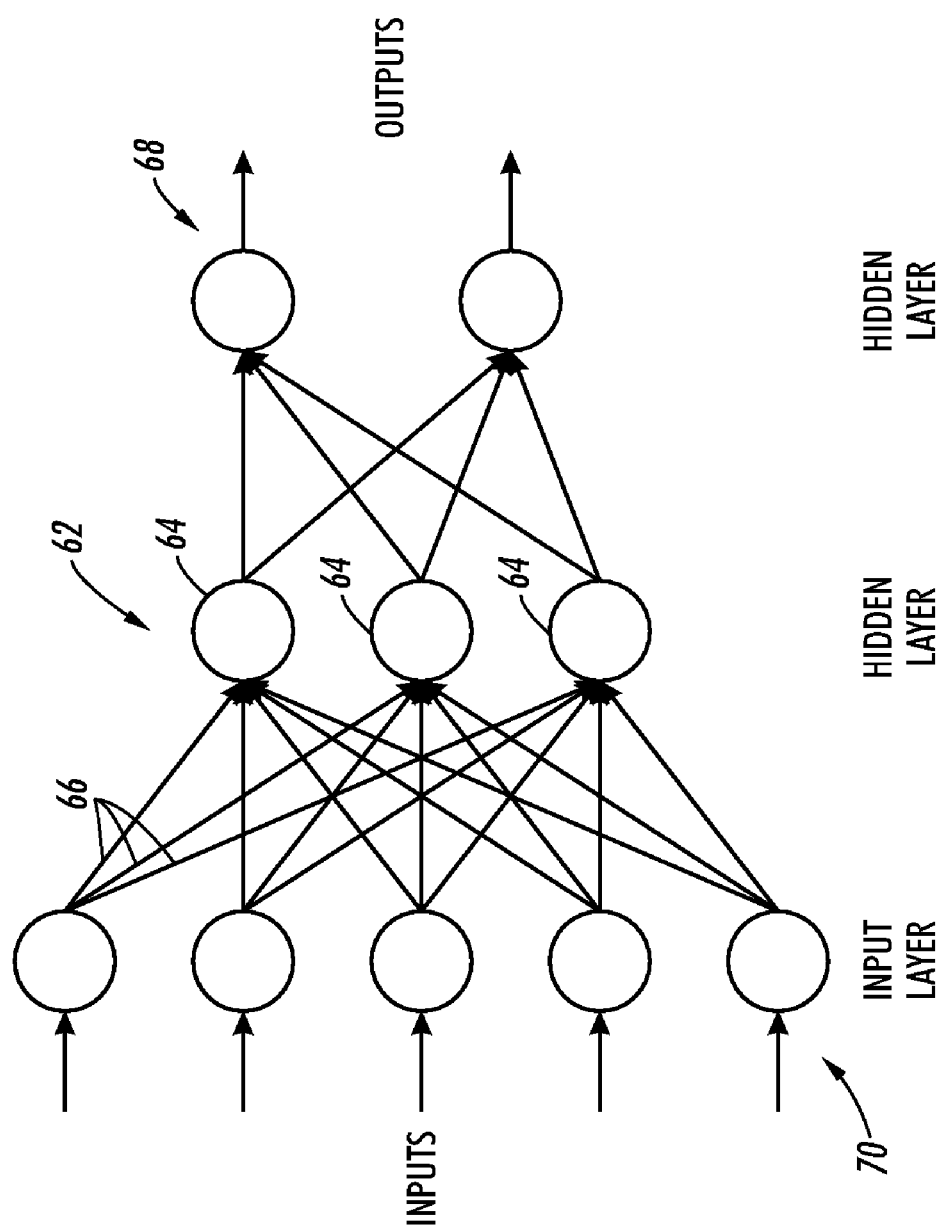
FIG. 8 is a schematic view of an exemplary neural network model suitable for use with the disclosed embodiments.

Referring now to FIG. 8, an approach for using a neural network in the context of time series forecasting is described. As is known by those skilled in the art, a neural network, a basic representation of which is designated in FIG. 8 by the numeral 62, is an information processing paradigm that is inspired by the way biological nervous systems, such as the brain, process information. The key element of this paradigm is the novel structure of the information processing system. It is composed of a large number of highly interconnected processing elements (neurons) 64 working in unison to solve specific problems. Neural networks, with their remarkable ability to derive meaning from complicated or imprecise data, can be used to extract patterns and detect trends that are too complex to be noticed by either humans or other computer techniques. A trained neural network 62 can be thought of as an "expert" in the category of information it has been given to analyze. This expert can then be used to provide projections given new situations of interest and answer "what if" questions.

The neurons 64 have weights associated with connections 66 and, to develop an input-output mapping, training is performed to determine the optimal value of these weights. Once the neural network 62 has been trained, it can be used to predict one or more of the outputs 68 for any given input 70. The advantage of this training method is that it can learn quite arbitrary mappings with significant non-linearity that may be very difficult to model using first-principles modeling.

Referring still to FIG. 8, at each neuron 64, a weighted sum of the incoming inputs are computed which is then multiplied by an activation function or transfer function a(f) of the neuron 64—where f denotes the weighted sum of the inputs at the neuron 64. Some commonly used activation functions include:

$$a(f) = \begin{cases} 1 & \text{if } f \geq 0 \\ 0 & \text{otherwise} \end{cases} \quad (1)$$

$$a(f) = \text{sgn}(f) \begin{cases} 1 & \text{if } f \geq 0 \\ -1 & \text{if } < 0 \end{cases} \quad (2)$$

$$a(f) = \frac{1}{1 + e^{-\lambda f}} \quad (3)$$

$$f = \sum w_i x_i \quad (4)$$

In one embodiment, a radial basis function (RBF) can be used to describe the underlying model of the illustrated neural network of FIG. 8. As is well documented, the RBF may comprise a real-valued function whose value depends only on the distance from a selected origin, so that $\phi(X)=\phi(\|x\|)$; or alternatively on the distance from some other point c, called a center, so that $\phi(x, c)=\phi(\|x-c\|)$. The norm used is a Euclidean norm. Further, in one example of the disclosed embodiments, the RBF includes a Gaussian RBF.

The Gaussian RBF may be defined as, $$\phi(r)=\exp(-\beta r^2) \text{ for some } \beta>0 \quad (5)$$

To summarize, the illustrated neural network 62 of FIG. 8 includes a single layer of multiple neurons, and is trained using a back-propagation algorithm. As described further below, the neural network is particularly effective in forecasting future print-related demand from previously collected print-related demand data.

In one example of operation, 100 points (representing prior print-related demand over a selected time interval) are used to train the network which can then be used to forecast a selected number of days into the future. For instance, prior print-related demand data corresponding with n previous days (e.g., the last 10 days) may be communicated to the inputs 70 (FIG. 8) for obtaining print-related demand data corresponding with the $(n+1)^{th}$ day (the $11^{th}$ or future day). In essence, time series data is being input to the neural network 62 for the sake of obtaining future demand data.

Figure 9:
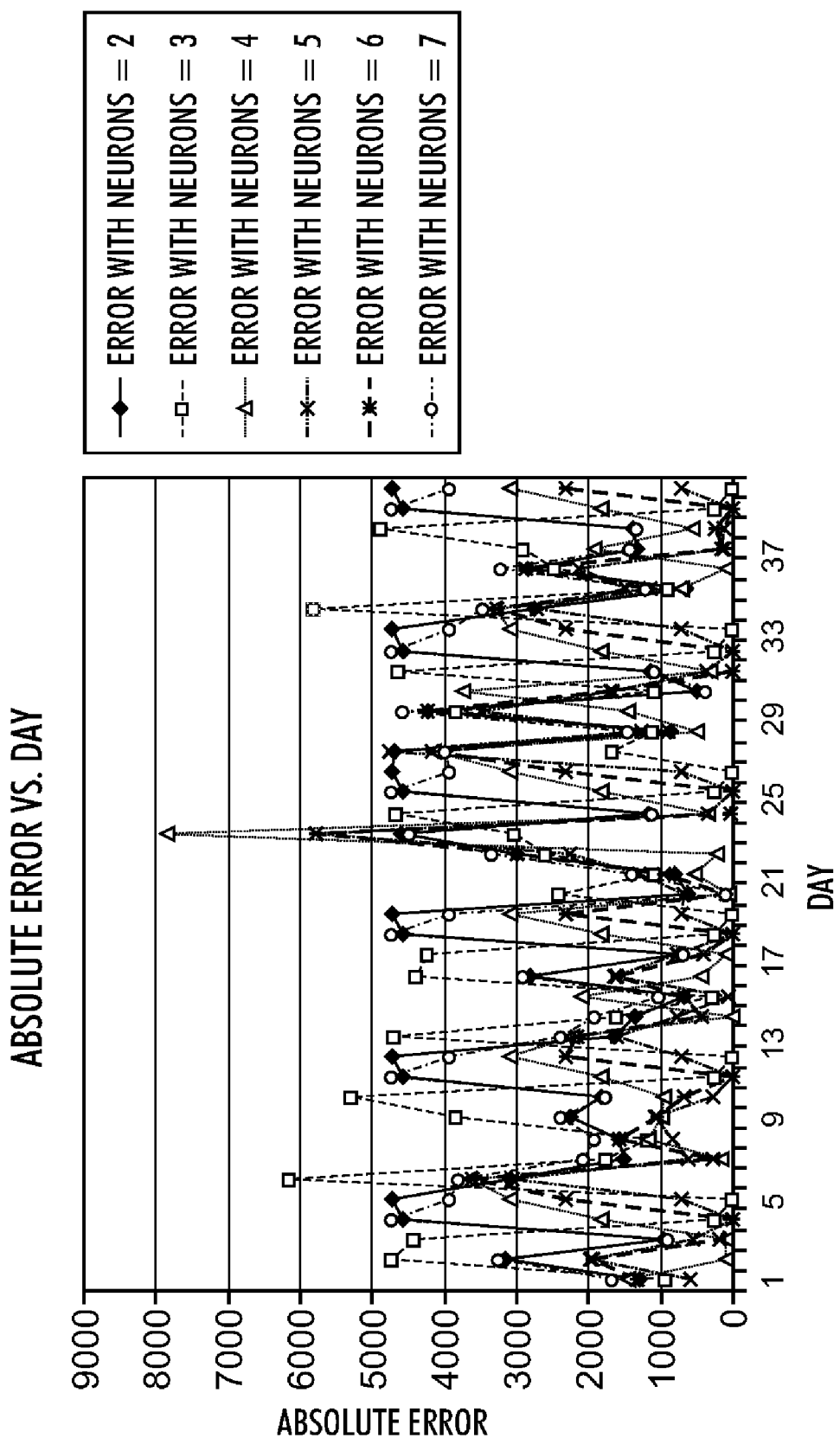
FIG. 9 includes an aggregate of graphs with each graph illustrating a change in absolute error for a neuron over a selected time interval.

Mean absolute deviation (MAD) and/or mean absolute percentage error (MAPE) may be used in assessing forecasting accuracy of the neural network 62. As is known, absolute deviation is the difference between the actual and the forecasted value, and MAD is the mean of the entire set. Similarly, percentage error in forecast is the absolute deviation divided by the actual value, while MAPE is the average across the entire set. Referring to Table 2 immediately below and FIG. 9, results of forecasting with a varying number of neurons over 40 days in the hidden layer (FIG. 8) is shown.

TABLE 2

Forecasting errors for neural networks with varying number of neurons

| Number of Neurons | MAD | MAPE (%) |
|---|---|---|
| 2 | 1701 | 25 |
| 3 | 3147 | 50 |
| 4 | 1047 | 17 |
| 5 | 1225 | 19 |
| 6 | 1329 | 20 |
| 7 | 915 | 16 |

Based on these results, it is clear that utilizing neural networks with different number of neurons produces forecasts with varying accuracy. Moreover, the results suggest that a static structure can become sub-optimal as new data is acquired, especially given the inventor's observation that a document production environment encountering a diverse range of job types will be dynamic in nature. To facilitate an optimizing technique for the number of neurons, a prototype was built that searches through the number of neurons in a single layer network using a Gaussian RBF to determine the number of neurons that give the best forecasts.

Once the network 62 (FIG. 8) has been tuned for a particular training data set, it can then be used for future forecasts. Typically, the forecasting capability achievable with network 62 will not be used in real-time. Rather, such capability might be suited for use at fixed intervals (e.g., on a daily, weekly, monthly or even quarterly basis) depending on the document production application (e.g., inventory planning, capacity planning, sales etc.) dictating the demand forecasts. In one embodiment, model tuning can be performed offline to determine the number of neurons in each layer that will result in the most accurate forecasts for the available data. In practice, as more print-related demand data is collected, the number of neurons can be re-optimized.

Figure 10:
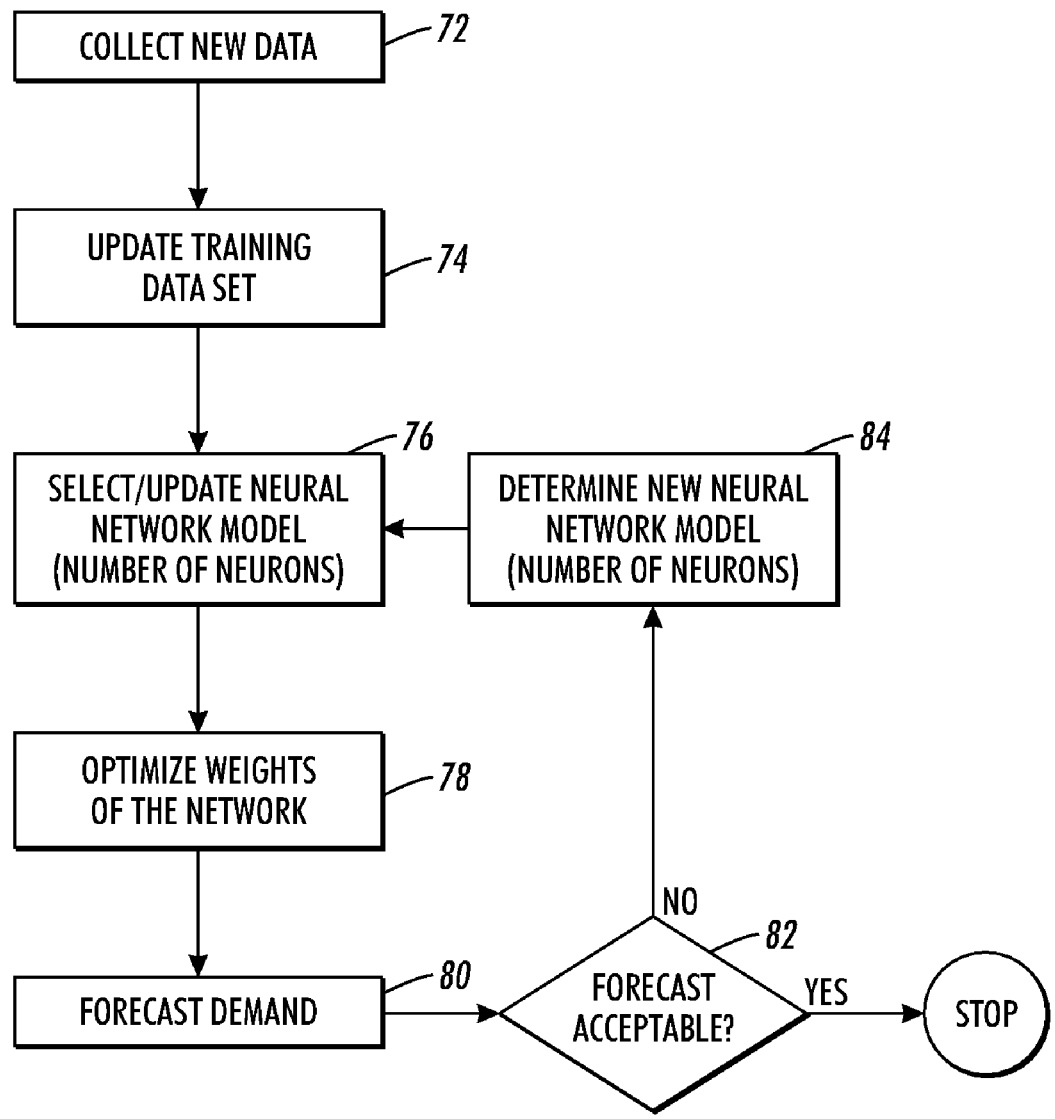
FIG. 10 is a flowchart illustrating a method for optimizing neural network forecasting models to improve forecast accuracy.

As indicated above, due to the dynamic nature of a typical document production environment, it may be desirable to periodically re-optimize the neural network 62 (FIG. 8). Referring to FIG. 10, a flowchart of a method for performing such re-optimization is shown. In anticipation of each optimizing cycle, a set of new print-related demand may be collected at 72. In turn, some of the collected data may be used, via 74, to update a training data set. At 76, a new neural network 62 may be selected, or a pre-existing neural network 62 updated. In addition to selecting or updating the neural network, 76 may include changing the number of neurons 64 (FIG. 8) in neural network 62. It will be appreciated that while only one hidden layer is shown in FIG. 8, based on the description provided thus far, multiple hidden layers could be used in the neural network 62. A network with multiple hidden layers could be trained with a back-propagation algorithm in a manner consistent with the training of a single hidden layer, as described above.

Referring still to FIG. 10, the weights of the neural network 62 selected or updated at 76 may be optimized (78) and the resulting neural network used to forecast demand (80) in accordance with the teachings above. The acceptability of the forecast at 80 can be accessed, at 82, with MAP and/or MAPE, as described above. As contemplated, an acceptable forecast must substantially equal or exceed a given accuracy reference. Alternative approaches, such as determining whether a forecast falls within a given forecast accuracy range, could also be used to answer 82. If the forecast is unacceptable, then a new neural network is determined at 84 and the process returns to 76 for further selection or updating of the neural network model 62. For an acceptable forecast, the optimization of FIG. 10 is stopped.

Based on the above description, the following features of the disclosed embodiments should now be apparent:

Print-related demand data, associated with a demand series obtained in a document production environment, may be processed with a neural network to obtain a print-related demand forecast. In one example, the demand series may comprise a high variability demand component.

The neural network may include a plurality of optimally weighted neurons and the plurality of neurons corresponds with a number. The number may be optimized to improve accuracy of forecasting. To accommodate dynamic fluctuations in document production environment, the number of neurons may be re-optimized after a selected time interval. The selected time interval may vary as a function of a document production application (including, among other applications, resource management, inventory planning and/or capacity planning) dictating demand forecasting. Forecasting accuracy may be measured with one of mean absolute deviation and mean absolute percentage error.

The neural network may comprise a second hidden layer with a plurality of optimally weighted neurons. A number of neurons of the second hidden layer may be optimized to improve accuracy of forecasting.

The neural network of the print-related demand forecasting system may be optimized with a method in which the forecasting accuracy of a neural network with a first number of neurons is compared with the forecasting accuracy of a neural network with a second number of neurons. In one example, the measured accuracy of each neural network is acceptable (i.e., substantially equal to or greater than a selected accuracy reference), and the optimal neuron number can be obtained by comparing either associated mean absolute deviations or associated mean absolute percentage errors.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A print-related demand forecasting system for use with a print production system in which multiple print jobs are processed over a selected time interval, comprising:
    a data collection tool, said data collection tool collecting print demand data for each print job processed during the selected time interval;
    mass memory for storing the collected print demand data; and
    a computer implemented service manager for processing the stored print demand data to obtain a first demand series with two or more demand components and a second demand series with one demand component, each one of the two or more demand components being less than a selected variability level and the one demand component being greater than the selected variability level, said computer implemented service manager being adapted to (1) generate a first demand related forecast with a combination of the two or more demand components, and (2) generate a second demand related forecast with the one demand component, wherein the second demand related forecast is generated with a neural network,
    wherein the neural network includes a layer including a plurality of neurons with each one of the plurality of neurons being weighted and the weighting of each one of the plurality of neurons being optimized with respect to a set of print-related demand data collected over one or more selected time intervals, wherein the plurality of neurons correspond with a number, wherein the number of neurons is optimized to improve accuracy of forecasting and re-optimized after a selected time interval that varies as a function of a document production application dictating demand forecasting.

2. The print-related demand forecasting system of claim 1, wherein the document production application includes one of inventory planning, resource management, and capacity planning.

3. The print-related demand forecasting system of claim 1, in which the set of print-related demand data comprises a first set of print-related demand data and the respective weights of the plurality of neurons are optimized at a first time, wherein the respective weights of the plurality of neurons are re-optimized at a second time with respect to a second set of print-related demand data collected over one or more selected time intervals.

4. The print-related demand forecasting system of claim 1, in which the layer comprises a first layer, further comprising a second layer including a plurality of neurons with each one of the plurality of neurons being weighted and the weighting of each one of the plurality of neurons being optimized.

5. The print-related demand forecasting system of claim 1, wherein one of mean absolute deviation and mean absolute percentage error is used as a measure of forecasting accuracy.

6. The print-related demand forecasting system of claim 5, in which the plurality of neurons of the second layer corresponds with a number, wherein the number of neurons of the second layer is optimized to improve accuracy of forecasting.

7. A system of forecasting print-related demand in a document production environment, comprising:
   a processor; and
   a processor readable storage medium in communication with the processor, the processor readable storage medium containing one or more programming instructions for:
      providing a hidden layer including a plurality of neurons and causing each one of the plurality of neurons to be weighted with a first set of print-related demand data, wherein the plurality of neurons correspond with a number,
      optimizing the number of neurons to improve accuracy of forecasting,
      providing an input layer including a plurality of inputs, the plurality of inputs communicating with the plurality of neurons of the hidden layer,
      communicating a second set of print-related demand data to the plurality of inputs of the input layer, the second set of print-related demand data corresponding with a demand series obtained from the document production environment,
      re-optimizing the number of neurons after a selected time interval elapses, wherein the selected time interval varies as a function of a document production application dictating demand forecasting, and
      responsive to communicating the second set of print-related demand data to the plurality of inputs, generating a print-related demand forecast output for the document production environment with the plurality of weighted neurons of the hidden layer.

8. The print-related demand forecasting system of claim 7, in which the demand series comprises a high variability demand component, wherein said generating comprises generating the print-related demand forecast for the high variability demand component.

9. The print-related demand forecasting system of claim 7, wherein the document production application includes one of inventory planning, resource management, and capacity planning.

10. The print-related demand forecasting system of claim 7, wherein one of mean absolute deviation and mean absolute percentage error is used as a measure of forecasting accuracy.

11. The print-related demand forecasting system of claim 7, in which the hidden layer comprises a first hidden layer, further comprising a second hidden layer including a plurality of neurons with each one of the plurality of neurons of the second hidden layer being weighted and the weighting of each one of the plurality of neurons of the second hidden layer being optimized.

12. The print-related demand forecasting system of claim 11, in which the plurality of neurons of the second hidden layer corresponds with a number, wherein the number of neurons of the second hidden layer is optimized to improve accuracy of forecasting.

13. A method for optimizing a print-related demand forecasting system, comprising:
   providing, by a processor, a hidden layer including a plurality of neurons and causing each one of the plurality of neurons to be weighted with a first set of print-related demand data, wherein the plurality of neurons correspond with a number;
   optimizing, by the processor, the number of neurons to improve accuracy of forecasting;
   providing, by the processor, an input layer including a plurality of inputs, the plurality of inputs communicating with the plurality of neurons of the hidden layer;
   communicating, by the processor, a second set of print-related demand data to the plurality of inputs of the input layer, the second set of print-related demand data corresponding with a demand series obtained from the document production environment;
   re-optimizing, by the processor, the number of neurons after a selected time interval elapses, wherein the selected time interval varies as a function of a document production application dictating demand forecasting; and
   responsive to communicating the second set of print-related demand data to the plurality of inputs, generating, by the processor, a print-related demand forecast output for the document production environment with the plurality of weighted neurons of the hidden layer.

14. The method of claim 13, in which the demand series comprises a high variability demand component, wherein said generating comprises generating the print-related demand forecast for the high variability demand component.

15. The method of claim 13, wherein the document production application includes one of inventory planning, resource management, and capacity planning.

16. The method of claim 13, wherein one of mean absolute deviation and mean absolute percentage error is used as a measure of forecasting accuracy.

17. The method of claim 13, in which the hidden layer comprises a first hidden layer, further comprising a second hidden layer including a plurality of neurons with each one of the plurality of neurons of the second hidden layer being weighted and the weighting of each one of the plurality of neurons of the second hidden layer being optimized.

18. The method of claim 17, in which the plurality of neurons of the second hidden layer corresponds with a number, wherein the number of neurons of the second hidden layer is optimized to improve accuracy of forecasting.

* * * * *